US012644327B2

(12) United States Patent
Von Matern

(10) Patent No.: US 12,644,327 B2
(45) Date of Patent: Jun. 2, 2026

(54) CONTROL ARRANGEMENT FOR ACCESS MEMBER, AND ACCESS MEMBER SYSTEM

(71) Applicant: ASSA ABLOY AB, Stockholm (SE)

(72) Inventor: Johan Von Matern, Täby (SE)

(73) Assignee: ASSA ABLOY AB, Stockholm (SE)

( * ) Notice: Subject to any disclaimer, the term of this patent is extended or adjusted under 35 U.S.C. 154(b) by 14 days.

(21) Appl. No.: 18/689,678

(22) PCT Filed: Sep. 5, 2022

(86) PCT No.: PCT/EP2022/074641

§ 371 (c)(1),
(2) Date: Mar. 6, 2024

(87) PCT Pub. No.: WO2023/036744

PCT Pub. Date: Mar. 16, 2023

(65) Prior Publication Data

US 2025/0129652 A1 Apr. 24, 2025

(30) Foreign Application Priority Data

Sep. 10, 2021 (SE) .................................... 2151116-7

(51) Int. Cl.
*E05F 3/16* (2006.01)
*E05F 15/619* (2015.01)

(52) U.S. Cl.
CPC .............. *E05F 15/619* (2015.01); *E05F 3/16* (2013.01); *E05Y 2201/21* (2013.01);
(Continued)

(58) Field of Classification Search
CPC E05F 15/619; E05F 1/105; E05F 3/16; E05Y 2201/41
See application file for complete search history.

(56) References Cited

U.S. PATENT DOCUMENTS 11,261,637 B2 * 3/2022 Bacchetti .............. E05F 1/1253
11,939,794 B2 * 3/2024 Arbegard .............. E05B 47/063
(Continued)

FOREIGN PATENT DOCUMENTS

EP 0298514 1/1989
EP 0298514 A1 * 1/1989 ................ E05F 3/16
(Continued)

OTHER PUBLICATIONS

"PCT EP 2022074641 Written Opinion mailed Dec. 23, 2022", 8 pages.
(Continued)

*Primary Examiner* — Muhammad Ijaz
*Assistant Examiner* — Susan M. Heschel
(74) *Attorney, Agent, or Firm* — Schwegman Lundberg & Woessner, P.A.

(57) ABSTRACT

A control arrangement (20) for controlling movements of an access member (14), the control arrangement comprising a base structure (22); a drive member (32) rotatable about a rotation axis (28); an input member (38) arranged to be driven along an actuation axis (40) by rotation of the drive member, and arranged to move in a lateral direction (74, 76); an output member (50) arranged to be driven by the input member along the actuation axis; an electromagnetic generator (58) arranged to be driven by movement of the output member along the actuation axis to generate electric energy; and a force transmitting arrangement (42, 52; 116) arranged to transmit a relative movement between the input member and the output member along the actuation axis to a movement of the input member in the lateral direction towards the base structure for frictional braking between the input member and the base structure.

15 Claims, 10 Drawing Sheets

(52) U.S. Cl.
CPC ..... *E05Y 2201/26* (2013.01); *E05Y 2201/638* (2013.01); *E05Y 2201/722* (2013.01); *E05Y 2400/616* (2013.01); *E05Y 2800/676* (2013.01); *E05Y 2900/132* (2013.01)

(56) References Cited

U.S. PATENT DOCUMENTS

| | | | | |
|---|---|---|---|---|
| 2002/0133904 | A1* | 9/2002 | Donovan | E05F 3/16 16/49 |
| 2007/0256362 | A1 | 11/2007 | Hansen | |
| 2013/0305854 | A1 | 11/2013 | Wildforster et al. | |
| 2017/0275938 | A1 | 9/2017 | Langenberg | |
| 2018/0002965 | A1* | 1/2018 | Sauter | E05F 3/10 |

FOREIGN PATENT DOCUMENTS

| | | |
|---|---|---|
| EP | 2933414 | 10/2015 |
| WO | 2023036744 | 3/2023 |

OTHER PUBLICATIONS

"PCT EP 2022074641 ISR mailed Dec. 23, 2022", 5 pages.
"PCT EP 2022074641 IB 304 Notification mailed Oct. 6, 2022", 1 pages.
"SE application 2151116 7 Final Notice mailed May 12, 2023", 40 pages.
"SE application 2151116 7 Intention to Grant mailed Jul. 10, 2023", 3 pages.
"SE application 2151116 7 Office Action with SE search report mailed Apr. 12, 2022", 7 pages.

* cited by examiner

CONTROL ARRANGEMENT FOR ACCESS MEMBER, AND ACCESS MEMBER SYSTEM

CROSS-REFERENCE TO RELATED APPLICATION(S)

This application is a national stage application under 35 U.S.C. § 371 of PCT Appl. No. PCT/EP2022/074641, titled "Control Arrangement for Access Member, and Access Member System," filed Sep. 5, 2022, which claims priority to Swedish Patent Appl. No. 2151116-7, filed Sep. 10, 2021, each of which is incorporated herein by reference in its entirety.

TECHNICAL FIELD

The present disclosure generally relates to control of movements of an access member. In particular, a control arrangement for controlling movements of an access member relative to a frame, and an access member system comprising such control arrangement, are provided.

BACKGROUND

Some conventional door closers comprise a spring and a hydraulic cylinder containing oil. The spring may be increasingly compressed (or otherwise deformed) during opening of the door leaf. The hydraulic cylinder may provide a damping force proportional to the speed of the door leaf. The use of oil may however not be desired, for example due to fire safety, leakage and sustainability. Moreover, such conventional door closers often have unsatisfactory reliability, for example due to temperature changes and wear. Furthermore, such conventional door closers are often bulky and expensive.

SUMMARY

One object of the present disclosure is to provide a control arrangement for controlling movements of an access member relative to a frame, which control arrangement is cost-efficient.

A further object of the present disclosure is to provide a control arrangement for controlling movements of an access member relative to a frame, which control arrangement has a compact design.

A still further object of the present disclosure is to provide a control arrangement for controlling movements of an access member relative to a frame, which control arrangement has relatively few components.

A still further object of the present disclosure is to provide a control arrangement for controlling movements of an access member relative to a frame, which control arrangement enables accurate control of the movements.

A still further object of the present disclosure is to provide a control arrangement for controlling movements of an access member relative to a frame, which control arrangement solves several or all of the foregoing objects in combination.

A still further object of the present disclosure is to provide an access member system comprising a control arrangement, which access member system solves one, several or all of the foregoing objects.

According to a first aspect, there is provided a control arrangement for controlling movements of an access member relative to a frame, the control arrangement comprising a base structure; a drive member rotatable relative to the base structure about a rotation axis; an input member arranged to be driven relative to the base structure along an actuation axis by rotation of the drive member about the rotation axis, and arranged to move in a lateral direction with respect to the actuation axis relative to the base structure; an output member arranged to be driven by the input member relative to the base structure along the actuation axis; an electromagnetic generator arranged to be driven by movement of the output member along the actuation axis to generate electric energy; and a force transmitting arrangement arranged to transmit a relative movement between the input member and the output member along the actuation axis to a movement of the input member in the lateral direction towards the base structure for frictional braking between the input member and the base structure.

The drive member may be arranged to rotate about the rotation axis by movement of the access member relative to the frame, such as by rotation of the access member relative to the frame. When installed in an access member system, each rotational position of the access member relative to the frame (e.g. rotation about a hinge axis) may correspond to a unique rotational position of the drive member about the rotation axis.

Throughout the present disclosure, the access member may be a door leaf. In case the drive member is fixed to an arm of a connection device interconnecting the door leaf and the frame, the drive member will only move over small angular distances, at low speeds and with high forces during opening and closing of the door leaf. In order to brake the door leaf with only a generator, a gearbox with a high ratio and a high rating would be required between the drive member and the generator. Such gearbox is bulky and expensive.

Due to the force transmitting arrangement, frictional braking of the input member against the base structure is obtained. The input member and the base structure may thus be said to constitute a friction brake. The frictional braking of the input member and the resistance provided to the input member due to the electric energy harvesting by the generator cause braking of the drive member. The braking of the drive member can in turn be used to brake a closing movement of the door leaf or other access member. The control arrangement may thus be configured to harvest electric energy during closing of the access member. The control arrangement may optionally be configured to also harvest electric energy during opening of the access member.

When the generator is driven to harvest electric energy, the generator provides a certain resistance to the output member against movement along the actuation axis. This resistance may be referred to as a harvesting force. When the force on the input member along the actuation axis is larger than the harvesting force, there will be a relative movement between the input member and the output member along the actuation axis. This relative movement will be transmitted by the force transmitting arrangement to a lateral movement of the input member towards the base structure. The input member will thereby be brought into contact with the base structure, or will be forced harder against the base structure. In this way, the control arrangement enables any excess force from the drive member, with respect to the harvesting force, to be frictionally braked.

By varying an electric load on the generator, the harvesting force can be varied. As a consequence, the frictional braking between the input member and the base structure, and a consequential braking of the access member, can be controlled by controlling an electric load on the generator. The generator thereby functions as a servo.

The input member may move laterally relative to the base structure from a position entirely separated from the base structure to one or more positions with frictional contact therebetween. Alternatively, the input member may always be in frictional contact with the base structure. In any case, the input member may comprise a first brake pad for frictionally contacting the base structure. The first brake pad may be resilient.

When the input member frictionally contacts the base structure, friction losses occur. For this reason, not all energy input to the drive member is transmitted to the output member. The control arrangement is thus intentionally built with low efficiency. Even if large forces act on the drive member, only small forces can be transmitted by the force transmitting arrangement to the output member. One major advantage with this is that the components on the output side can be made of a relatively simple, weak and cheap design. For example, the rating of the generator can be low and cheap materials, such as plastic, can be used. The control arrangement can thereby be made very cost-efficient and compact. At the same time, the generator enables smartness and movements of the drive member (and e.g. a door leaf connected thereto) to be accurately controlled. The control arrangement thus enables a small generator to cause a large braking force of the drive member.

The force transmitting arrangement may optionally be arranged to transmit a relative movement between the input member and the output member along the actuation axis to a movement of the output member in the lateral direction towards the base structure for frictional braking between the output member and the base structure. Thus, both the input member and the output member may be frictionally braked against the base structure. The output member may move laterally relative to the base structure from a position entirely separated from the base structure to one or more positions with frictional contact therebetween. Alternatively, the output member may always be in frictional contact with the base structure. In any case, the input member may comprise a second brake pad for frictionally contacting the base structure. The second brake pad may be resilient.

The drive member and the input member may be configured such that each rotational position of the drive member about the rotation axis corresponds to a position of the input member along the actuation axis relative to the base structure. The drive member may comprise a drive gear wheel. In this case, the control arrangement may further comprise an input gear rack meshing with the drive gear wheel. The input gear rack may be locked to the input member along the actuation axis. According to one variant, the input gear rack is rigidly connected to, or integrally formed with, the input member.

The control arrangement may further comprise a control system. The control system may comprise at least one data processing device and at least one memory having at least one computer program stored thereon, the at least one computer program comprising program code which, when executed by the at least one data processing device, causes the at least one data processing device to perform, or command performance of, various steps as described herein. According to one variant, the control system is configured to change the electric load of the generator.

The base structure may be fixed to either the access member or the frame. The base structure may comprise a housing. In this case, the drive member, the input member, the output member, the generator and the force transmitting arrangement may be provided inside the housing.

The force transmitting arrangement may comprise an inclined surface, inclined relative to the actuation axis. One inclined surface may be provided on each of the input member and/or the output member.

The inclined surface may be inclined 10 degrees to 40 degrees with respect to the actuation axis.

The control arrangement may further comprise one or more rollers arranged to engage the inclined surface. The rollers contribute to prevent locking between the input member and the output member. In case the inclined surface is provided on the input member, the one or more rollers may be provided on the output member, and vice versa. One or more rollers may also be provided between an input inclined surface on the input member and an output inclined surface on the output member.

As an alternative or complement to the inclined surface, the force transmitting arrangement may comprise a force transmitting arm between the input member and the output member. An input end of the force transmitting arm may be pivotally connected to the input member at an input pivot, and an opposite output end of the force transmitting arm may be pivotally connected to the output member at an output pivot.

When the input member moves faster than the output member during closing of the access member, the force transmitting arm will rotate about the output pivot. In this way, the input member will be pressed, or further pressed, against the base structure for frictional braking.

The control arrangement comprising the force transmitting arm may further comprise a base structure force device, such as a base structure spring connected between the output member and the base structure. The base structure force device may be arranged to force the output member in the opening direction. In this way, an angle of the force transmitting arm relative to the actuation axis can be maintained substantially constant during movement of the input member in the opening direction.

The input member may be movable along the actuation axis in an opening direction and in a closing direction, opposite to the opening direction. If the drive member is arranged to rotate about the rotation axis by rotation of the access member relative to the frame, the input member may move in the opening direction and in the closing direction during opening and closing, respectively, of the access member relative to the frame. Alternatively, or in addition, the opening direction may be a direction from the generator to the drive member, and vice versa.

The input member may be arranged to push the output member in the closing direction. The output member may be positioned at least partly in front of the input member along the actuation axis in the closing direction.

The input member may be arranged to pull the output member in the opening direction. The input member may comprise an input pulling surface and the output member comprises an output pulling surface. In this case, the input member may be arranged to pull the output member in the opening direction by contact between the input pulling surface and the output pulling surface.

The input pulling surface and the output pulling surface may be substantially perpendicular to, or perpendicular to, the actuation axis. In this way, frictional braking between the input member and the base structure can be avoided in the opening direction.

As an alternative to the input pulling surface and the output pulling surface, the input member may be arranged to pull the output member in the opening direction by the force transmitting arm. In this case, the input member can also push the output member in the closing direction via the force transmitting arm.

The control arrangement may further comprise a connection device for connection between the access member and the frame. In this case, a part of the connection device may be fixed to the drive member for common rotation about the rotation axis. The connection device may comprise one or more connection arms for connection between the access member and the frame. In case a plurality of connection arms are used, these may be arranged in series.

The control arrangement may further comprise a closing force device arranged to force rotation of the drive member about the rotation axis to thereby force movement of the input member along the actuation axis. The closing force device may comprise a spring, such as a linear spring. In one example, the closing force device comprises a compression coil spring. The closing force device and the base structure may or may not be fixed to the same of the access member and the frame. For example, the closing force device may be fixed to the frame and the base structure may be fixed to the access member. Alternatively, each of the closing force device and the base structure may be fixed to the access member.

The control arrangement may further comprise a drive member transmission configured to transmit a force from the closing force device to a rotation of the drive member about the rotation axis. The drive member transmission may comprise a cam profile and a cam follower arranged to follow the cam profile. In one example, the drive member comprises the cam profile and the closing force device comprises the cam follower.

The control arrangement may further comprise a generator wheel arranged to be rotationally driven by movement of the output member along the actuation axis, and a speed increasing generator transmission arranged to transmit a rotation of the generator wheel to a rotation of a rotor of the generator. The generator wheel may be a generator gear wheel.

The control arrangement may further comprise an output gear rack. The output gear rack may be locked to the output member along the actuation axis. According to one variant, the output gear rack is rigidly connected to the output member. The output gear rack may mesh with the generator gear wheel.

The input member and the output member may be made of different types of materials. The input member may be made of metal or alloy. Alternatively, or in addition, the output member may be made of plastic. The output member may be made of a material having a density that is less than 70%, such as less than 50%, than a density of a material of which the input member is made.

The control arrangement may further comprise a release force device arranged to force the input member and the output member away from each other along the actuation axis. In some variants, the release force device contributes to separation of the input member and the output member when the access member is in a closed position.

According to a further aspect, there is provided a door closer for controlling movements of a door leaf relative to a frame, where the door closer comprises a control arrangement according to the first aspect.

According to a further aspect, there is provided an access member system comprising the frame, the access member movable relative to the frame, and a control arrangement according to the first aspect. In this case, the base structure may be fixed to either the access member or to the frame. The access member may be rotatable relative to the frame.

According to a further aspect, there is provided an access member for movement relative to a frame, the access member comprising a control arrangement according to the first aspect. In this case, the base structure may be fixed to the access member.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1A:
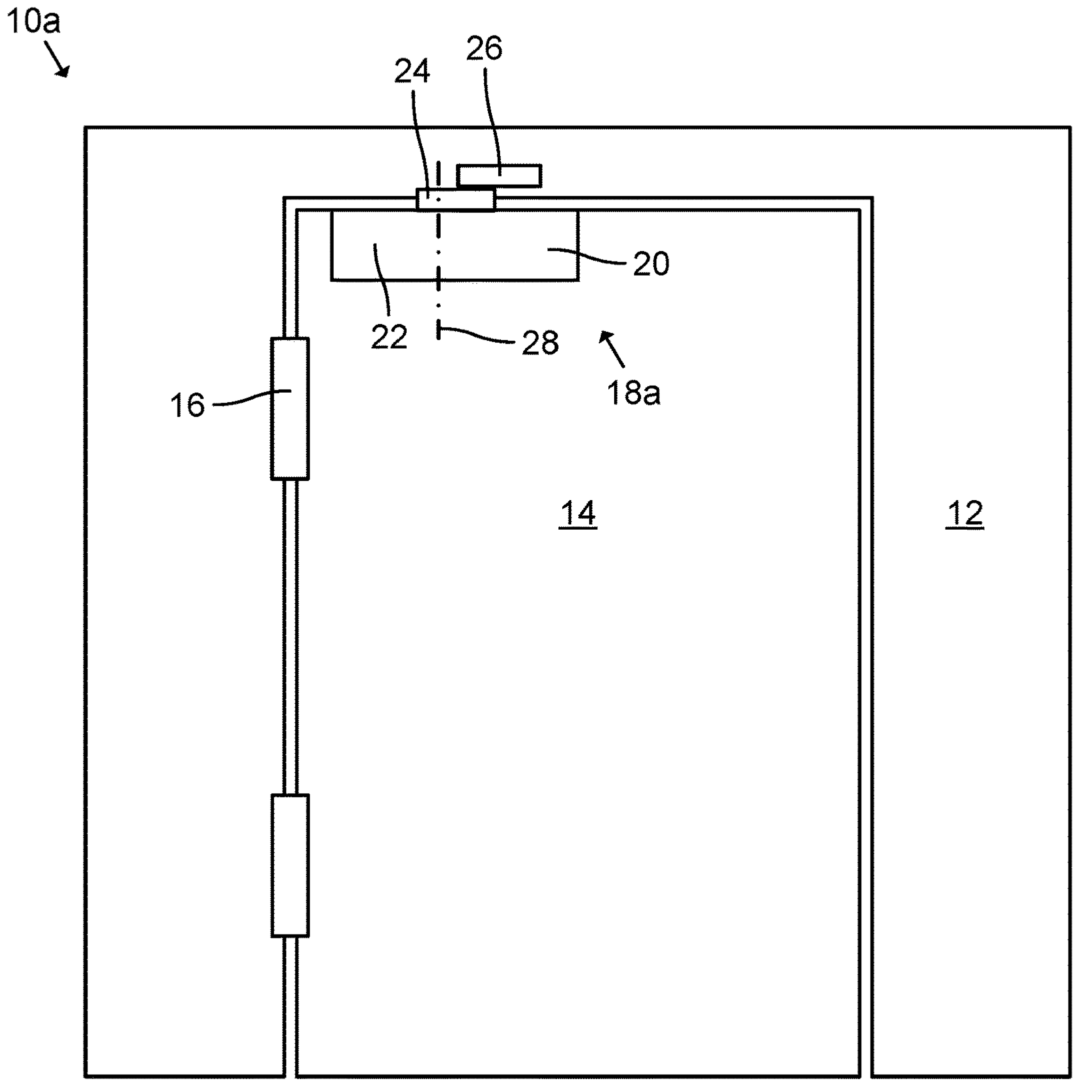
FIG. 1*a*: schematically represents a front view of an access member system comprising a door closer having a control arrangement.

In the following, a control arrangement for controlling movements of an access member relative to a frame, and an access member system comprising such control arrangement, will be described. The same or similar reference numerals will be used to denote the same or similar structural features.

Figure 1B:
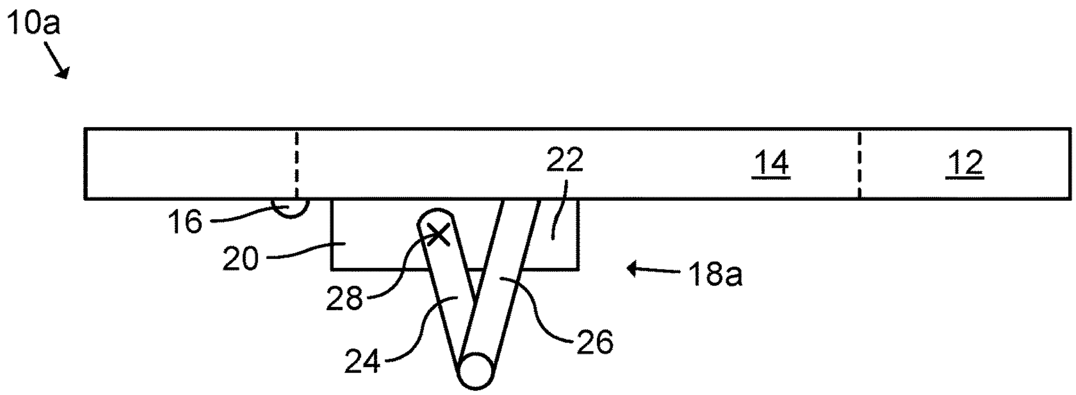
FIG. 1*b*: schematically represents a top view of the access member system in FIG. 1*a;*

FIG. 1*a* schematically represents a front view of an access member system 10*a*, and FIG. 1*b* schematically represents a top view of the access member system 10*a*. With collective reference to FIGS. 1*a* and 1*b*, the access member system 10*a* comprises a frame 12 and an access member, here exemplified as a door leaf 14. The door leaf 14 is rotatable relative to the frame 12 by means of two door leaf hinges 16.

The access member system 10*a* of this example further comprises a door closer 18*a*. The door closer 18*a* here comprises a control arrangement 20. The control arrangement 20 comprises a base structure 22. The base structure 22 of this example comprises a housing, here illustrated as a cuboid box. In this example, the base structure 22 is fixed to the door leaf 14. The base structure 22 may be arranged outside or inside the door leaf 14.

The door closer 18*a* of this specific example further comprises a first connection arm 24 and a second connection arm 26. The first and second connection arms 24, 26 constitute one example of a connection device according to the present disclosure. The first connection arm 24 constitutes one example of a part of a connection device according to the present disclosure. The first connection arm 24 is connected to the control arrangement 20 and is rotatable relative to the base structure 22 about a rotation axis 28. The rotation axis 28 is here vertical.

The second connection arm 26 is pivotally connected to each of the first connection arm 24 and the frame 12. When a user releases the door leaf 14 in an open position, the door closer 18*a* will pull the door leaf 14 to the illustrated closed position.

Figure 2A:
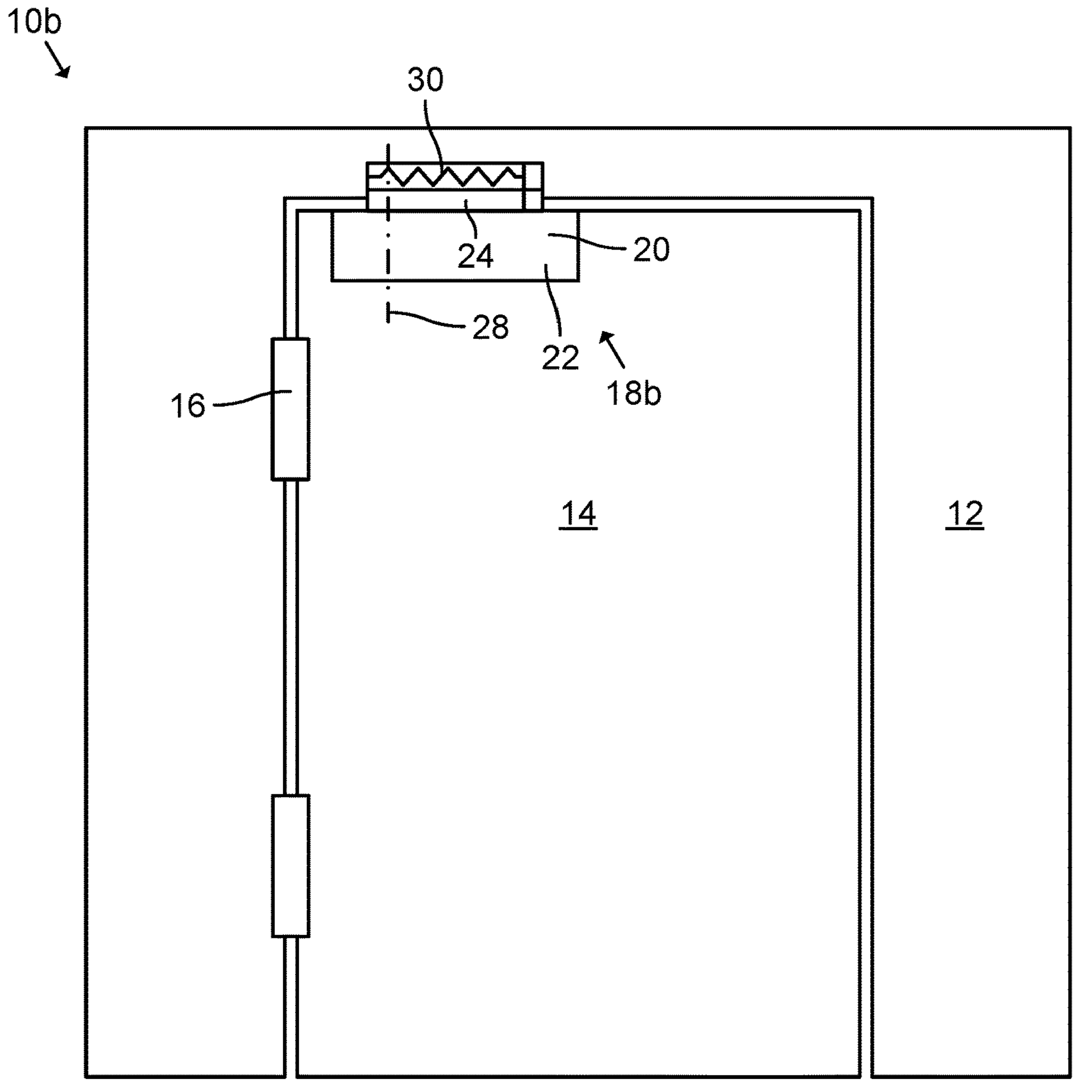
FIG. 2*a*: schematically represents a front view of a further example of an access member system comprising a further example of a door closer having the arrangement.
Figure 2B:
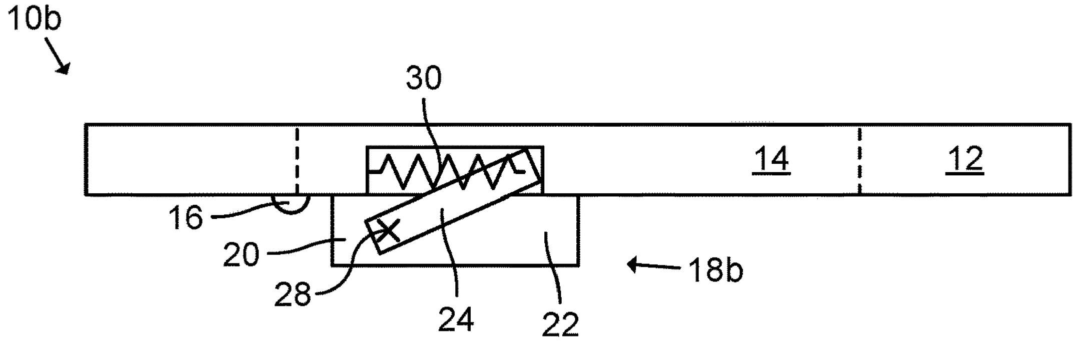
FIG. 2*b*: schematically represents a top view of the access member system in FIG. 2*a;*

FIG. 2*a* schematically represents a front view of a further example of an access member system 10*b*, and FIG. 2*b* schematically represents a top view of the access member system 10*b* in FIG. 2*a*. With collective reference to FIGS. 2*a* and 2*b*, mainly differences to FIGS. 1*a* and 1*b* will be described. The access member system 10*b* comprises a further example of a door closer 18*b*. The door closer 18*b* comprises a connection device with only one arm, here represented as the first connection arm 24. Similarly to the door closer 18*a*, the first connection arm 24 of the door closer 18*b* is rotatable about the rotation axis 28. However, a second end of the first connection arm 24 is arranged to travel linearly in parallel with the frame 12. The door closer 18*b* comprises an external closing spring 30 for forcing the second end of the first connection arm 24 (to the right in FIGS. 2*a* and 2*b*) such that the door leaf 14 closes. The closing spring 30 is one example of a closing force device according to the present disclosure. The closing spring 30 is external to the base structure 22.

Figure 3A:
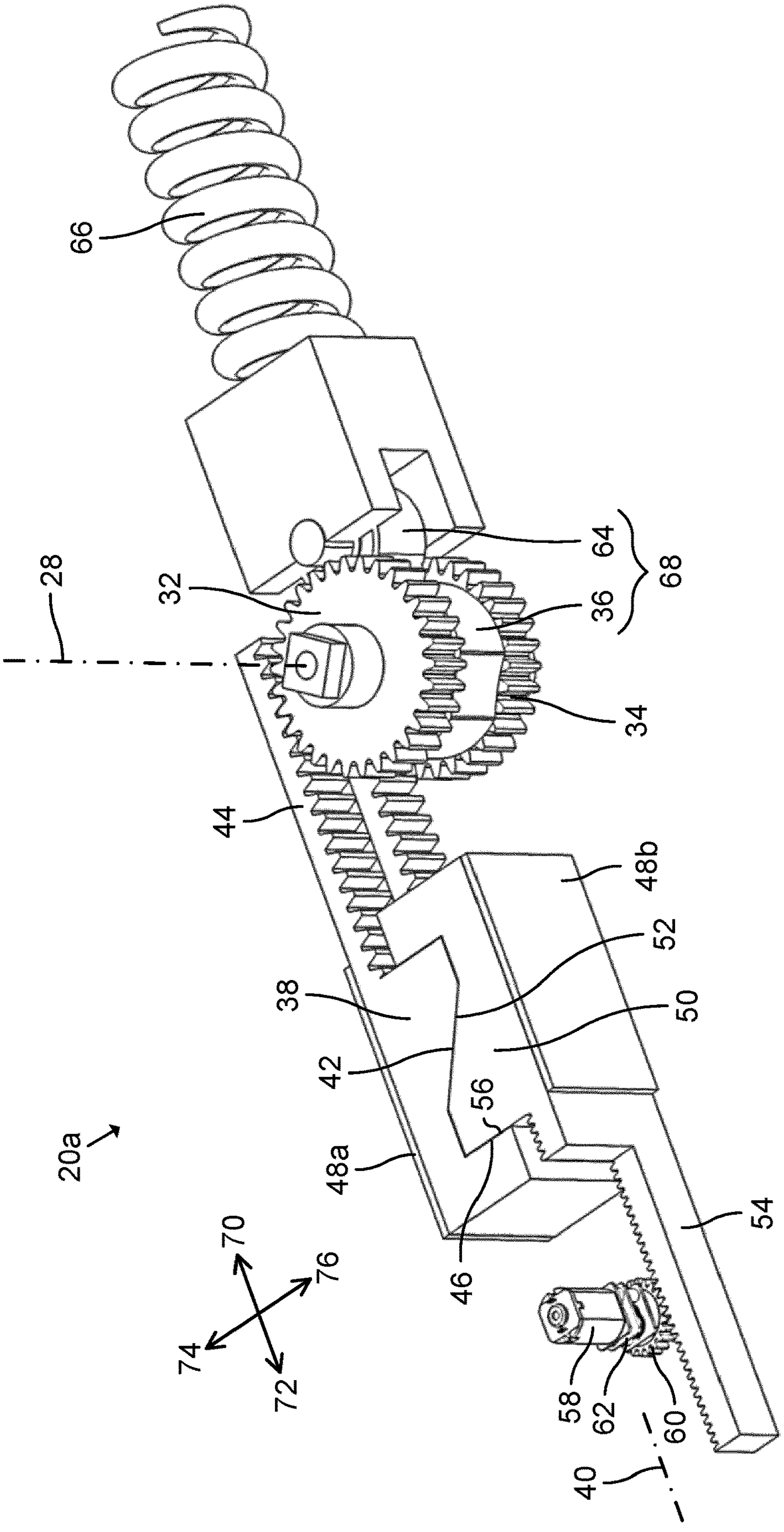
FIG. 3*a*: schematically represents a perspective view of one example of a control arrangement.
Figure 3B:
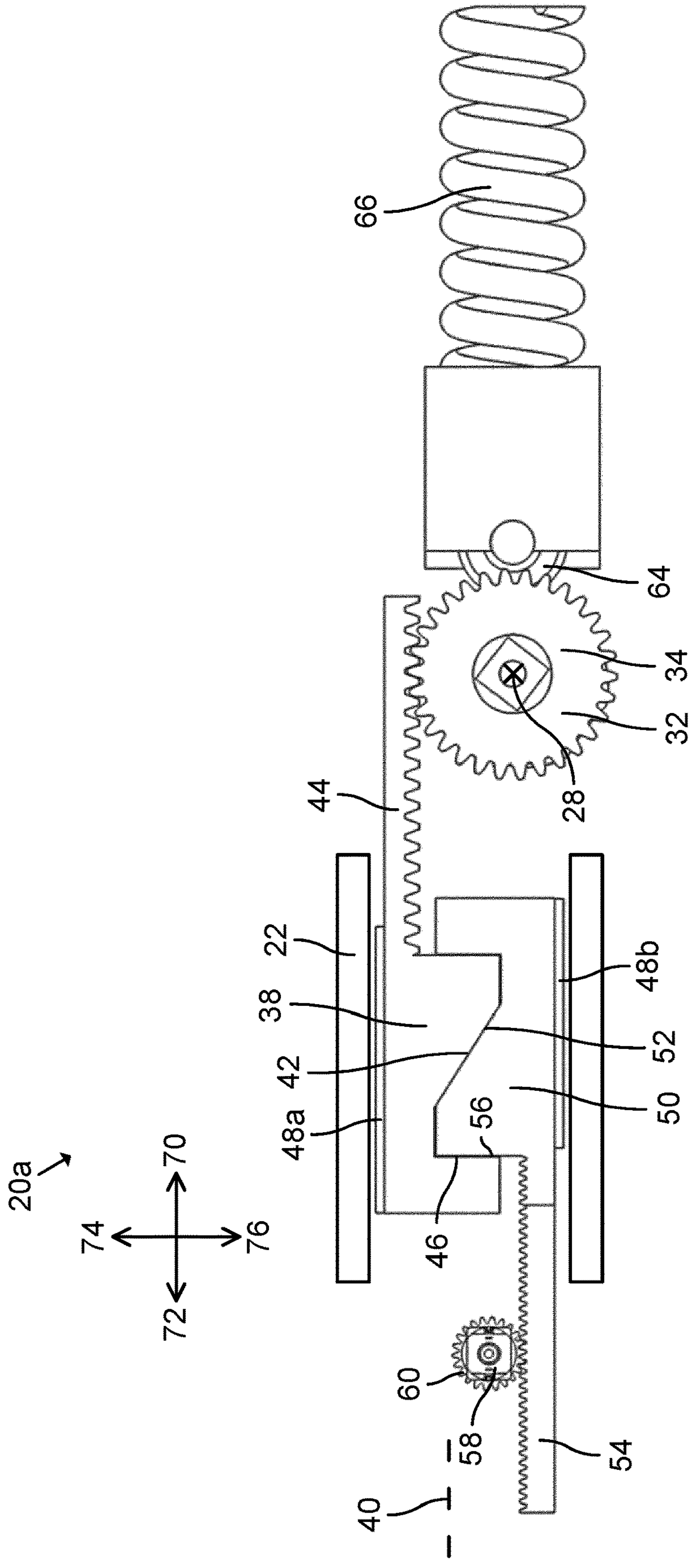
FIG. 3*b*: schematically represents a top view of the control arrangement in FIG. 3*a;*

FIG. 3*a* schematically represents a perspective view of one example of a control arrangement 20*a*, and FIG. 3*b* schematically represents a top view of the control arrangement 20*a* in FIG. 3*a*. The control arrangement 20*a* may be used as the control arrangement 20 in any of the door closers 18*a*, 18*b*.

The control arrangement 20*a* comprises a drive member 32. The drive member 32 is rotatable about the rotation axis 28 relative to the base structure 22. In use, the drive member 32 may be fixed to the first connection arm 24 for common rotation about the rotation axis 28. The drive member 32 of this specific example comprises two drive gear wheels 34 and a cam profile 36. The cam profile 36 is here provided between the two drive gear wheels 34.

The control arrangement 20*a* further comprises an input member 38. The input member 38 is arranged to be driven linearly relative to the base structure 22 along an actuation axis 40 by rotation of the drive member 32 about the rotation axis 28. The input member 38 comprises an input inclined surface 42.

The control arrangement 20*a* of this specific example further comprises two input gear racks 44. The input gear racks 44 are here integrally formed with the input member 38. Each input gear rack 44 is in meshing engagement with a respective of the two drive gear wheels 34. The use of two drive gear wheels 34 and two input gear racks 44 stabilizes the input member 38 against rotation about the actuation axis 40. However, only one pair of drive gear wheel 34 and input gear rack 44 may alternatively be used.

The input member 38 of this specific example further comprises an input pulling surface 46. The input inclined surface 42 is here positioned between the input pulling surface 46 and the input gear rack 44 along the actuation axis 40.

The input member 38 of this example further comprises a first brake pad 48*a*. As shown in FIG. 3*b*, the first brake pad 48*a* is arranged to be brought into direct contact with the base structure 22.

The control arrangement 20*a* further comprises an output member 50. The output member 50 is arranged to be driven by the input member 38 relative to the base structure 22 along the actuation axis 40. The output member 50 comprises an output inclined surface 52.

The input inclined surface 42 and the output inclined surface 52 constitute one example of a force transmitting arrangement according to the present disclosure. In this example, the input inclined surface 42 and the output inclined surface 52 are parallel and angled approximately 30° to the actuation axis 40.

The control arrangement 20*a* of this specific example further comprises an output gear rack 54. The output gear rack 54 is here integrally formed with the output member 50.

The output member 50 of this specific example further comprises an output pulling surface 56. The output pulling surface 56 is here positioned between the output gear rack 54 and the output inclined surface 52 along the actuation axis 40. The input pulling surface 46 and the output pulling surface 56 are perpendicular to the actuation axis 40.

The output member 50 of this example further comprises a second brake pad 48*b*. As shown in FIG. 3*b*, also the second brake pad 48*b* is arranged to be brought into direct contact with the base structure 22 in this specific example.

The control arrangement 20*a* further comprises an electromagnetic generator 58. The generator 58 is arranged to be driven by movement of the output member 50 along the actuation axis 40 to harvest electric energy. To this end, the control arrangement 20*a* of this specific example further comprises a generator wheel 60 and a gearbox 62. The generator wheel 60 of this example is a generator gear wheel in meshing engagement with the output gear rack 54. The generator wheel 60 may however alternatively be driven by friction by an output part other than the output gear rack 54.

The gearbox 62 is a speed-reducing gearbox. That is, the gearbox 62 is configured to transmit a rotation of the generator wheel 60 at a first rotational speed to a rotation of a rotor of the generator 58 at a second rotational speed, higher than the first rotational speed. The gearbox 62 is one example of a generator transmission according to the present disclosure.

The control arrangement 20*a* of this specific example further comprises a cam follower 64 and an internal closing spring 66. The cam follower 64 is arranged to follow the cam profile 36. The cam follower 64 and the cam profile 36 constitute one example of a drive member transmission 68 according to the present disclosure. The drive member transmission 68 is configured to transmit a force from the closing spring 66 to a rotation of the drive member 32 about the rotation axis 28. The closing spring 66 is a further example of a closing force device according to the present disclosure.

The closing spring 66 is internal to the base structure 22. The closing spring 66 is here a compression spring, more specifically a compression coil spring. The closing spring 66 forces the cam follower 64 against the cam profile 36.

When a user opens the door leaf 14, the drive member 32 is caused to rotate about the rotation axis 28 (in a clockwise direction in FIGS. 3*a* and 3*b*), here due to the fixation between the first connection arm 24 and the drive member 32. The rotation of the drive gear wheels 34 drives the input gear racks 44, and the input member 38 fixed thereto, in an opening direction 70 along the actuation axis 40. Furthermore, when the drive member 32 is caused to rotate about the rotation axis 28, the drive member transmission 68 causes a deformation of the closing spring 66. In case the control arrangement **20*a* is used with the door closer 18*b*, also the external closing spring 30** is deformed.

During movement of the input member 38 in the opening direction 70, the input member 38 pulls the output member 50 in the opening direction 70 due to the engagement between the input pulling surface 46 and the output pulling surface 56. During this movement, there is little or no frictional contact between the first brake pad **48*a* and the base structure 22 and between the second brake pad 48*b* and the base structure 22**.

Movement of the input member 38 in the opening direction 70 causes the output gear rack 54, here fixed to the output member 50, to also move in the opening direction 70. The output gear rack 54 thereby drives the generator wheel 60 such that the rotor of the generator 58 is driven to rotate to harvest electric energy. However, energy harvesting during opening is optional. In some implementations, the user should not be required to provide both the force for deforming the closing spring 66 and for driving the generator 58.

When the user releases the door leaf 14 in an open position, the closing spring 66 forces the drive member 32 to rotate in an opposite direction about the rotation axis 28 (in a counterclockwise direction in FIGS. **3*a* and 3*b*). The rotation of the drive gear wheels 34 now drives the input gear racks 44, and the input member 38 fixed thereto, in a closing direction 72 along the actuation axis 40, opposite to the opening direction 70. During closing of the door leaf 14, large forces act on the input member 38**.

During movement of the input member 38 in the closing direction 72, the input member 38 pushes the output member 50 in the closing direction 72 due to the engagement between the input inclined surface 42 and the output inclined surface 52. Movement of the output member 50 in the closing direction 72 causes the output gear rack 54 to also move in the closing direction 72. The output gear rack 54 thereby drives the generator wheel 60 such that the rotor of the generator 58 is driven to rotate to harvest electric energy.

The electric energy harvesting by the generator 58 provides a counterforce to movements of the input member 38 in the closing direction 72. This counterforce may be referred to as a harvesting force. In case the force on the input member 38 in the closing direction 72 (generated by the closing movement of the door leaf 14) is larger than the harvesting force, the input inclined surface 42 will start sliding up on the output inclined surface 52. This causes the input member 38 to move in a lateral direction 74 such that the first brake pad **48*a* is pushed against the base structure 22. In this example, also the output member 50 is caused to move in a lateral direction 76, opposite to the lateral direction 74, such that the second brake pad 48*b* is pushed against the base structure 22. The movement of the input member 38 in the closing direction 72 along the actuation axis 40 is thereby frictionally braked. As a consequence, also the closing movement of the door leaf 14** is braked.

The input inclined surface 42 and the output inclined surface 52 thereby constitute one example of a force transmitting arrangement arranged to transmit a relative movement between the input member 38 and the output member 50 along the actuation axis 40 to a movement of the input member 38 in the lateral direction 74 towards the base structure 22 for frictional braking between the input member 38 and the base structure 22. When the input member 38 moves in the lateral direction 74, the input gear racks 44 will pivot slightly about their respective contact points with the drive gear wheels 34.

Since a large part of the energy added to the drive member 32 is transformed to heat during the frictional braking, the control arrangement **20*a* has a low efficiency. Even if large forces act on the drive member 32, only small forces will be transmitted to the output member 50. This is very valuable since the parts on the output side (here the output member 50, the output gear rack 54 and the generator wheel 60) can then be made small and with cheap materials. In this example, the drive member 32, the input gear racks 44 and the input member 38 are exposed to high forces and are made of steel, and the output member 50, the output gear rack 54 and the generator wheel 60 are exposed to low forces and are made of plastic. Also the rating of the generator 58 can be very low while still being capable of controlling braking of the door leaf 14**.

An increase of the angle between the inclined surfaces 42, 52 and the actuation axis 40 will cause a reduction of the efficiency of the force transmission arrangement. A decrease of the angle between the inclined surfaces 42, 52 and the actuation axis 40 enables a rating of the generator 58 to be further reduced.

Figure 4:
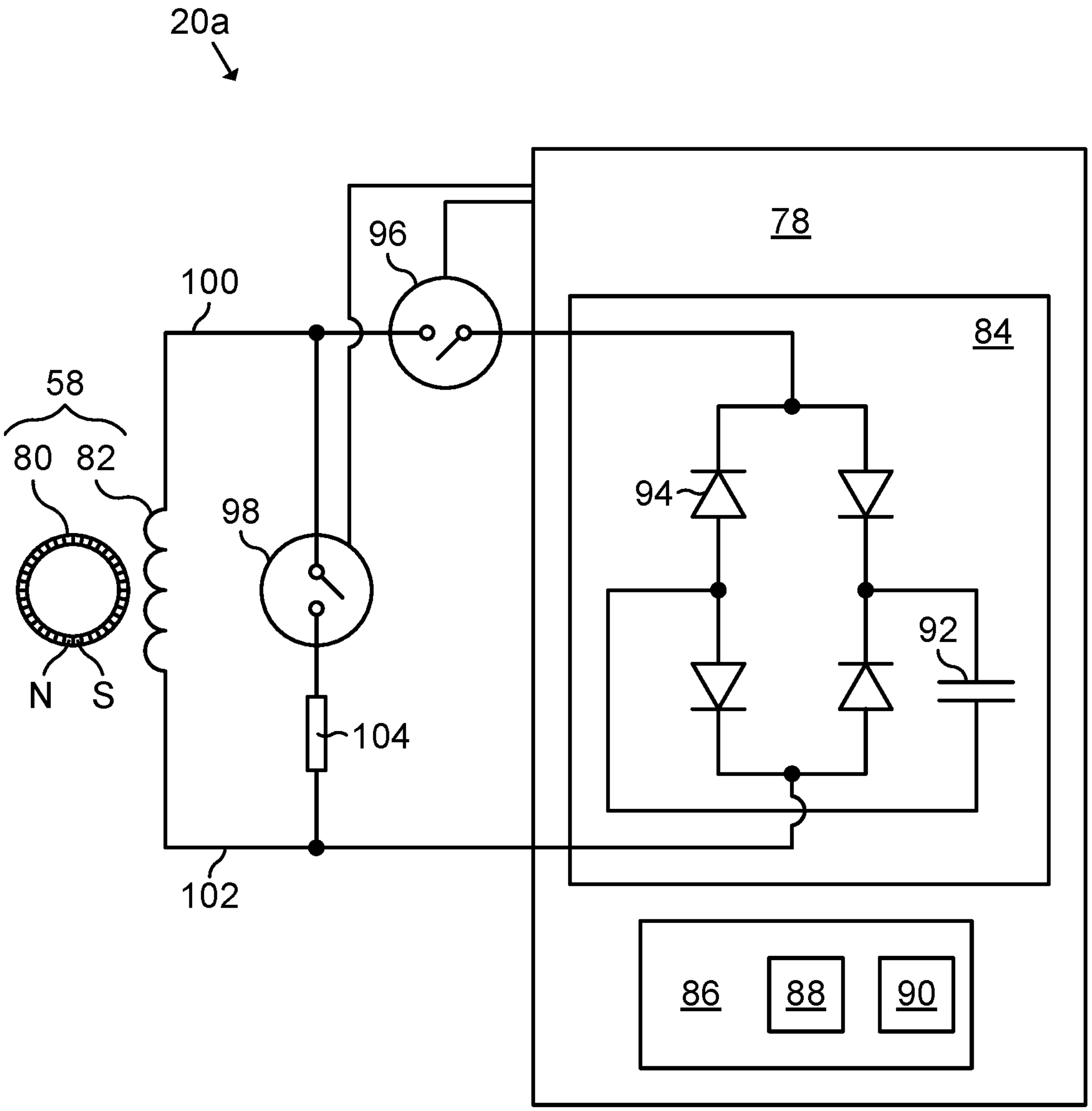
FIG. 4: schematically represents a generator and a control system.

FIG. 4 schematically represents the generator 58 and one specific example of a control system 78 of the control arrangement **20*a*. In FIG. 4, the rotor 80 and a stator 82 of the generator 58 can be seen. The control system 78 of the specific example in FIG. 4 comprises power management electronics 84 and a microcontroller 86. The microcontroller 86 comprises a data processing device 88 and a memory 90. A computer program is stored in the memory 90. The computer program comprises program code which, when executed by the data processing device 88 causes the data processing device 88** to perform, or command performance of, various steps as described herein.

The power management electronics 84 in FIG. 4 comprises energy harvesting electronics including an electric energy storage, here exemplified as a capacitor 92, and four diodes 94 arranged in a diode bridge. The diodes 94 are arranged to rectify the voltage from the generator 58.

The control arrangement **20*a* further comprises a disconnection switch 96 and a shorting switch 98. The disconnection switch 96 and the shorting switch 98 are examples of control elements. The disconnection switch 96 and the shorting switch 98 are electrically powered by the generator 58**.

Each of the disconnection switch 96 and the shorting switch 98 is controlled by the control system 78, more specifically by the microcontroller 86. FIG. 4 further shows a positive line 100 and a ground line 102. The positive line 100 and the ground line 102 are connected to respective terminals of the generator 58. In this example, the disconnection switch 96 is provided on the positive line 100. Each of the disconnection switch 96 and the shorting switch 98 may be implemented using a transistor, such as a MOSFET (Metal Oxide Semiconductor Field Effect Transistor).

The disconnection switch 96 is arranged to selectively disconnect the generator 58. When the disconnection switch 96 is open, the electric resistance becomes high, and the rotor 80 rotates lightly, in comparison with when the rotor 80 is rotated to harvest electric energy.

The shorting switch 98 is arranged to selectively short-circuiting the terminals of the generator 58 over an electric resistor 104. When the shorting switch 98 is closed, the harvested electric energy is converted to heat in the resistor 104. The rotor 80 thereby rotates heavily in comparison with when the rotor 80 is rotated to harvest electric energy. Thus, when the shorting switch 98 is closed, a high counter torque is provided in the generator 58, making the rotor 80 heavy to rotate.

By selectively controlling the disconnection switch 96 and the shorting switch 98, the control system 78 can selectively change an electric load of the generator 58 and thereby adjust the harvesting force. In this way, a movement of the output member 50 in the closing direction 72 can be controlled. The amount of frictional braking of the door leaf 14 can thereby also be controlled. At the end of the closing movement, the frictional braking can be reduced to provide a stronger latching force of the door leaf 14. The control arrangement 20*a* enables a wide range of different closing behaviors of the door leaf 14 to be implemented in software in the control system 78.

The control system 78 may be configured to determine the position of the door leaf 14 relative to the frame 12 based on position data from the rotor 80. Alternatively, or in addition, a dedicated sensor (not shown) for providing the position of the door leaf 14 relative to the frame 12 may be added. Such sensor may for example be positioned in the door leaf hinge 16.

Figure 5A:
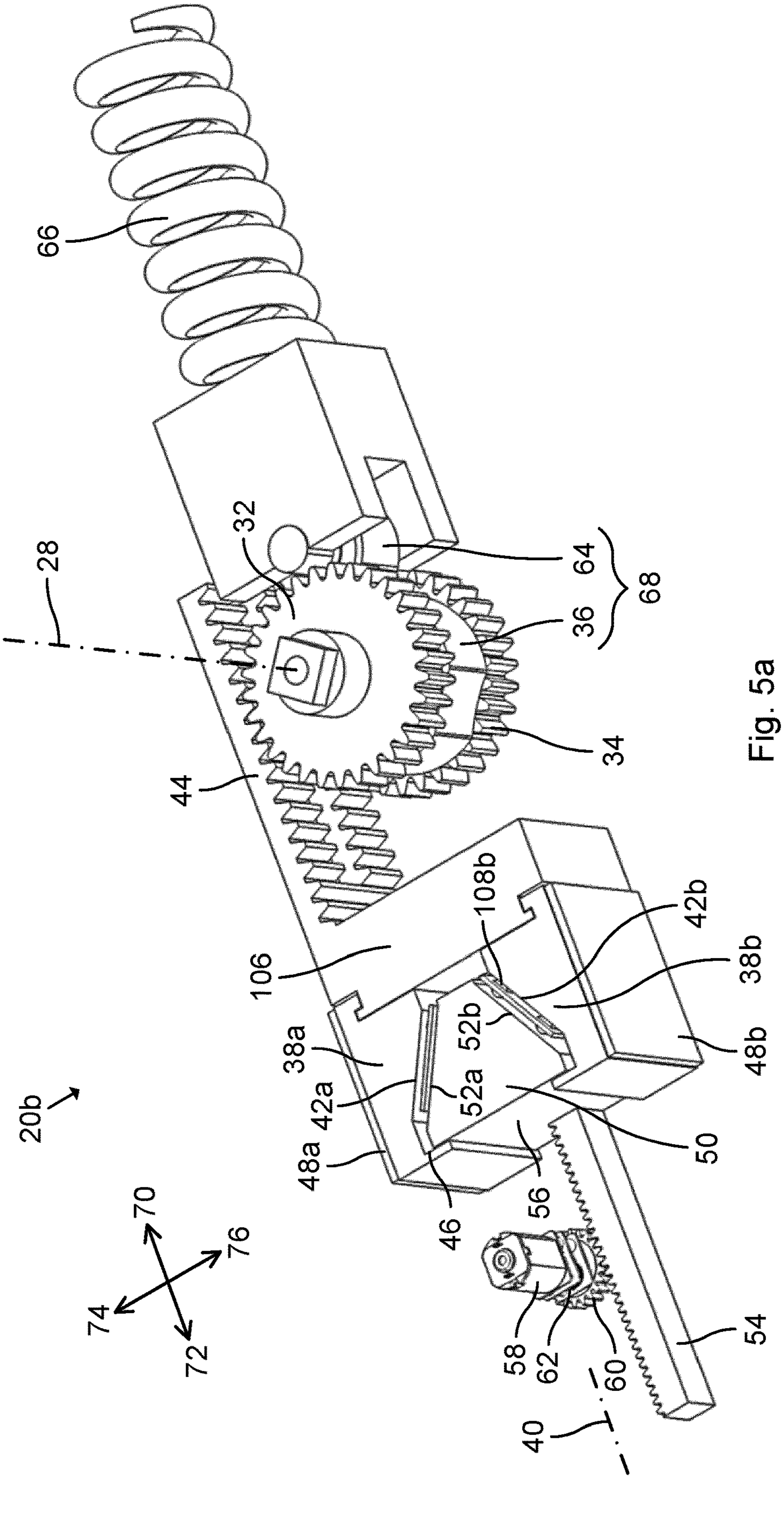
FIG. 5*a*: schematically represents a perspective view of a further example of a control arrangement.
Figure 5B:
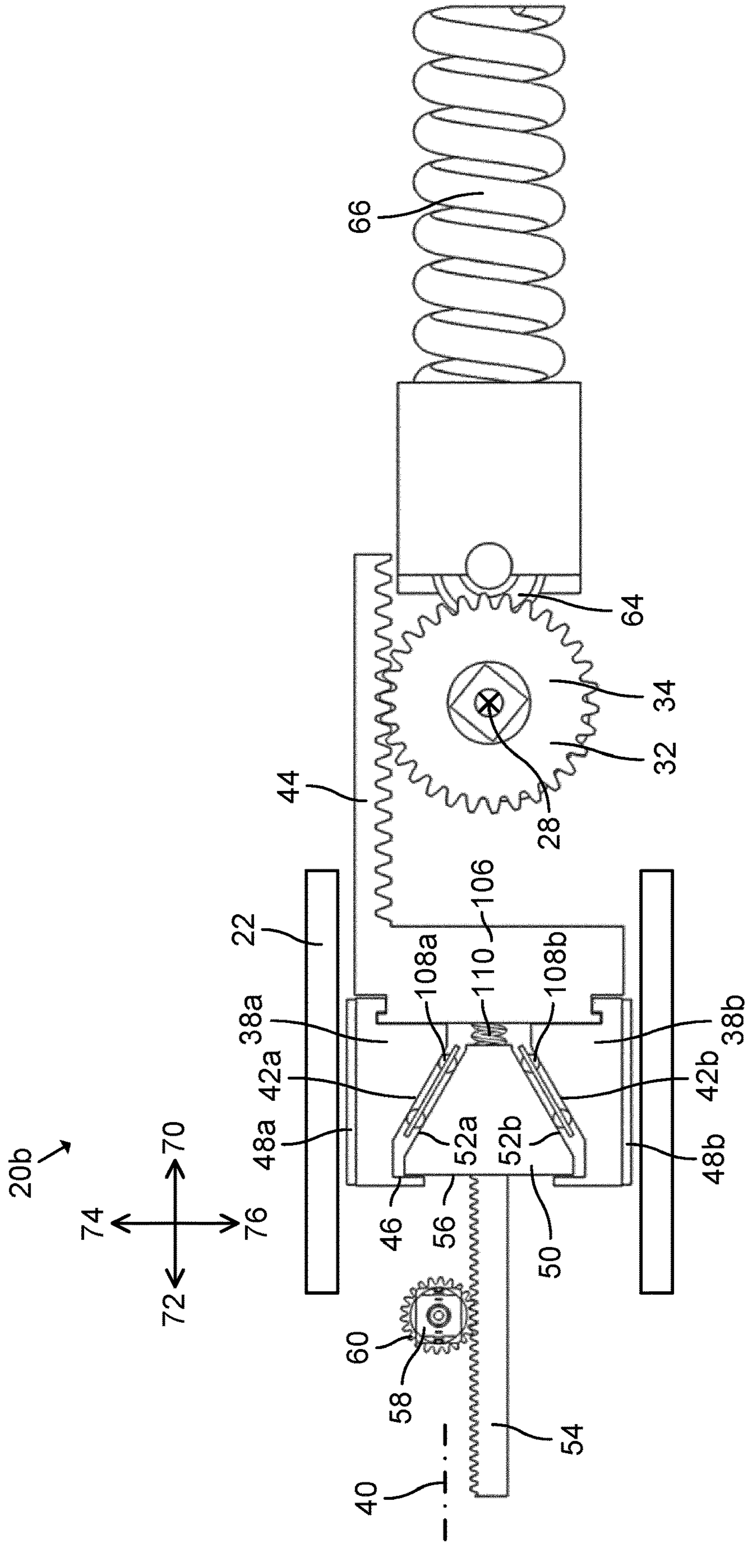
FIG. 5*b*: schematically represents a top view of the control arrangement in FIG. 5*a;*

FIG. 5*a* schematically represents a perspective view of a further example of a control arrangement 20*b*, and FIG. 5*b* schematically represents a top view of the control arrangement 20*b* in FIG. 5*a*. The control arrangement 20*b* may be used as the control arrangement 20 in any of the door closers 18*a*, 18*b*. With collective reference to FIGS. 5*a* and 5*b*, mainly differences with respect to FIGS. 3*a* and 3*b* will be described. The control arrangement 20*b* comprises a first input member 38*a* and a second input member 38*b*.

The first input member 38*a* comprises a first input inclined surface 42*a* and the second input member 38*b* comprises a second input inclined surface 42*b*. The first input member 38*a* carries the first brake pad 48*a* and the second input member 38*b* carries the second brake pad 48*b*.

The control arrangement 20*b* further comprises a base portion 106 from which the input gear racks 44 extend in the opening direction 70. The first input member 38*a* is movable relative to the base portion 106 in the lateral direction 74. The second input member 38*b* is movable relative to the base portion 106 in the lateral direction 76. The base portion 106, and the input gear racks 44 fixed thereto, are however locked to the input members 38*a*, 38*b* along the actuation axis 40.

In the control arrangement 20*b*, the output member 50 is V-shaped and is positioned laterally between the input members 38*a*, 38*b*. The output member 50 comprises a first output inclined surface 52*a* parallel with the first input inclined surface 42*a*, and a second output inclined surface 52*b* parallel with the second input inclined surface 42*b*.

The control arrangement 20*b* further comprises first rollers 108*a* between the first input inclined surface 42*a* and the first output inclined surface 52*a*, and second rollers 108*b* between the second input inclined surface 42*b* and the second output inclined surface 52*b*. The rollers 108*a*, 108*b* reduce friction between the input inclined surfaces 42*a*, 42*b* and the output inclined surfaces 52*a*, 52*b*, and prevent locking between the input members 38*a*, 38*b* and the output member 50.

The control arrangement 20*b* further comprises a release spring 110. The release spring 110 is one example of a release force device according to the present disclosure. The release spring 110 is here exemplified as a compression coil spring connected between the base portion 106 and the output member 50. The release spring 110 is configured to force the input members 38*a*, 38*b* and the output member 50 away from each other along the actuation axis 40. This enables separation of the input members 38*a*, 38*b* and the output member 50 in the closed position of the door leaf 14.

Figure 6:
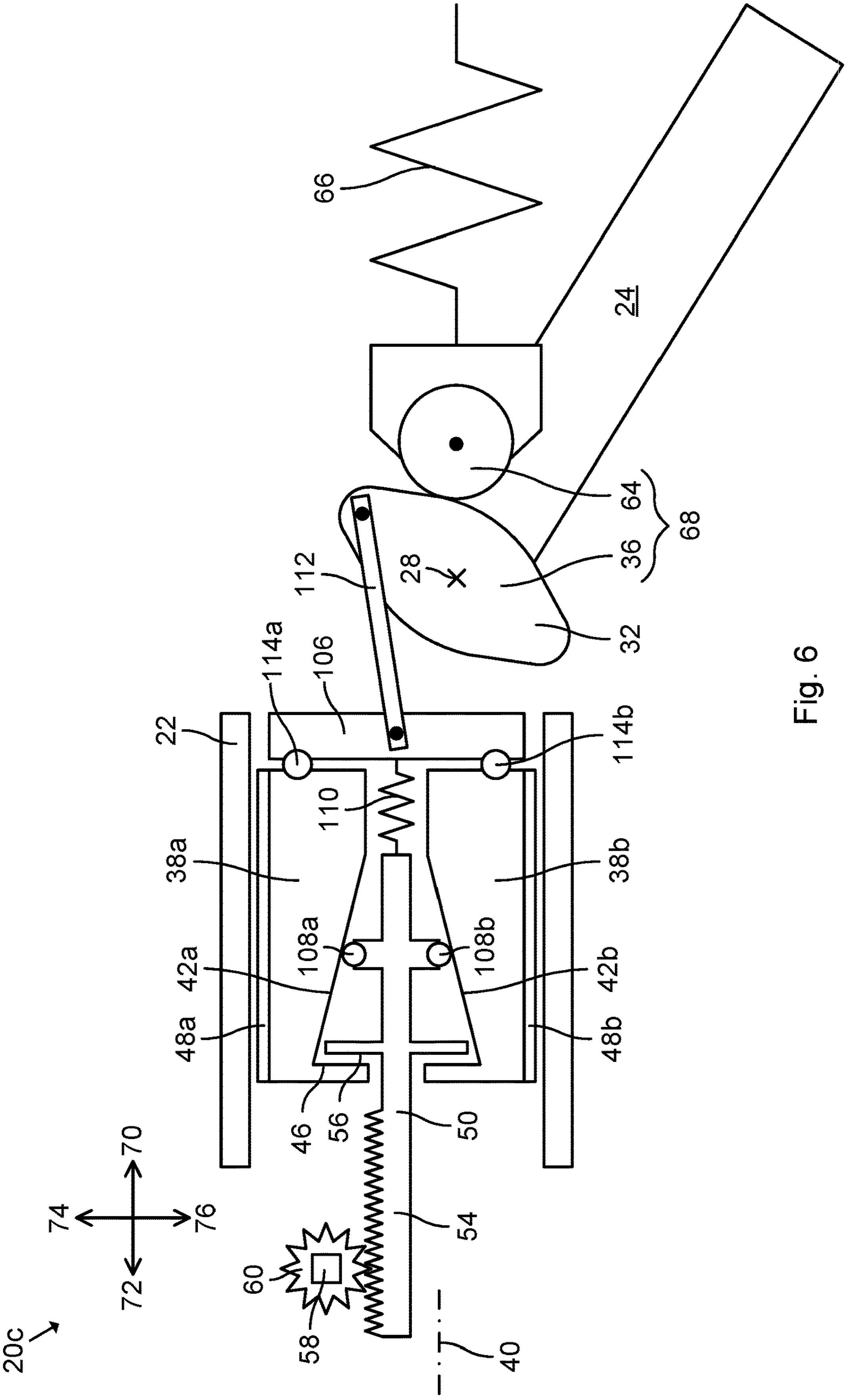
FIG. 6: schematically represents a top view of a further example of a control arrangement.

FIG. 6 schematically represents a top view of a further example of a control arrangement 20*c*. The control arrangement 20*c* may be used as the control arrangement 20 in any of the door closers 18*a*, 18*b*. Mainly differences with respect to FIGS. 3*a* and 3*b* will be described.

The drive member 32 of the control arrangement 20*c* comprises only the cam profile 36. FIG. 6 also shows how the first connection arm 24 is rigidly connected to the cam profile 36.

The control arrangement 20*c* comprises a drive part 112, here exemplified as a rod, pivotally connected to each of the drive member 32 and the base portion 106. The first input member 38*a* is pivotally connected to the base portion 106 by means of a first hinge 114*a* and the second input member 38*b* is pivotally connected to the base portion 106 by means of a second hinge 114*b*. In this way, the first input member 38*a* can move in the lateral direction 74 relative to the base portion 106, and the second input member 38*b* can move in the lateral direction 76 relative to the base portion 106, to accomplish the frictional braking.

The control arrangement 20*c* of this example comprises the input inclined surfaces 42*a*, 42*b*, but no output inclined surfaces. Instead, the output member 50 is elongated and comprises the output pulling surfaces 56 protruding laterally and output rollers 108*a*, 108*b* for engaging the input inclined surface 42*a*, 42*b*.

Figure 7A:
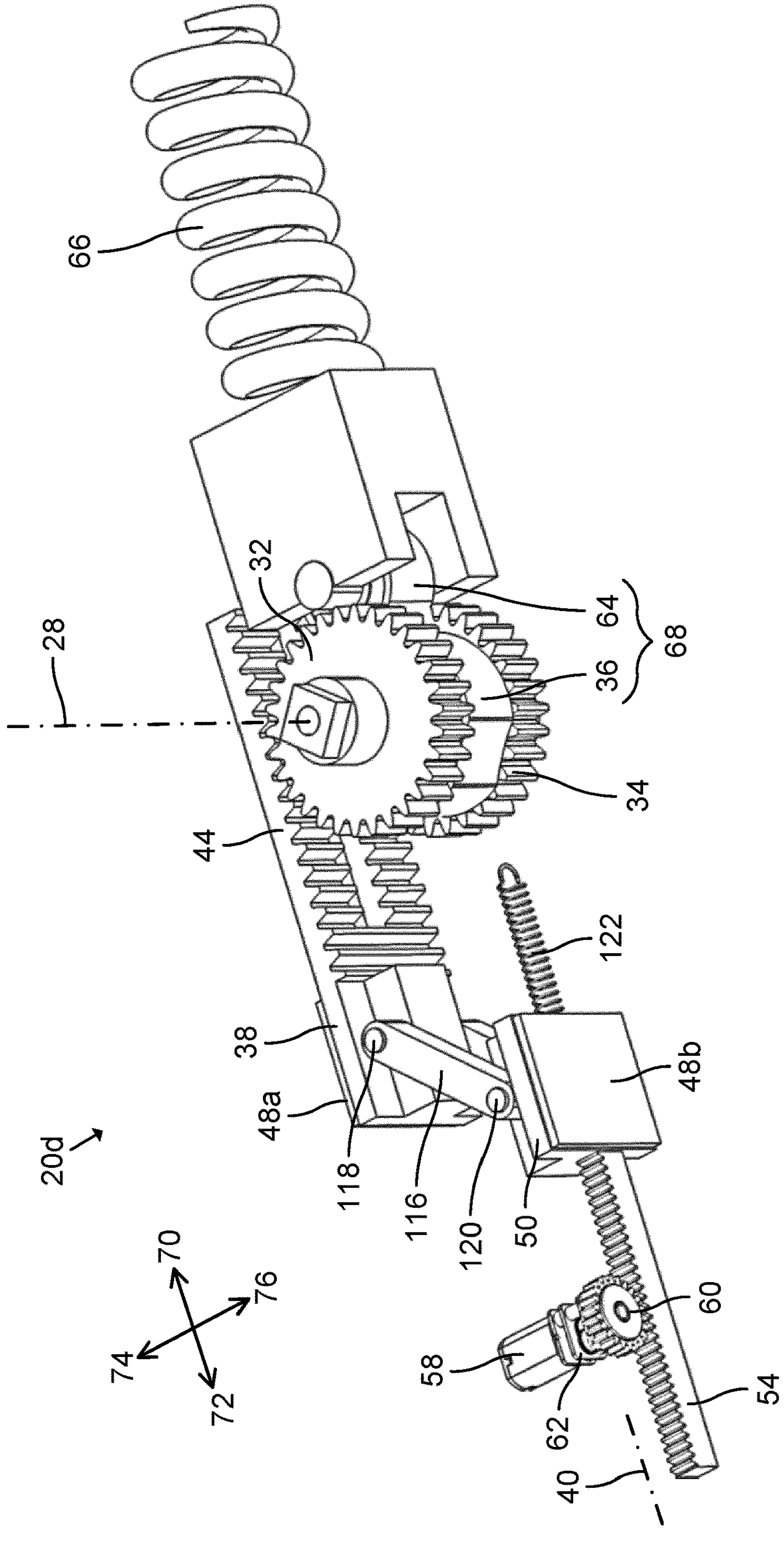
FIG. 7*a*: schematically represents a perspective view of a further example of a control arrangement.
Figure 7B:
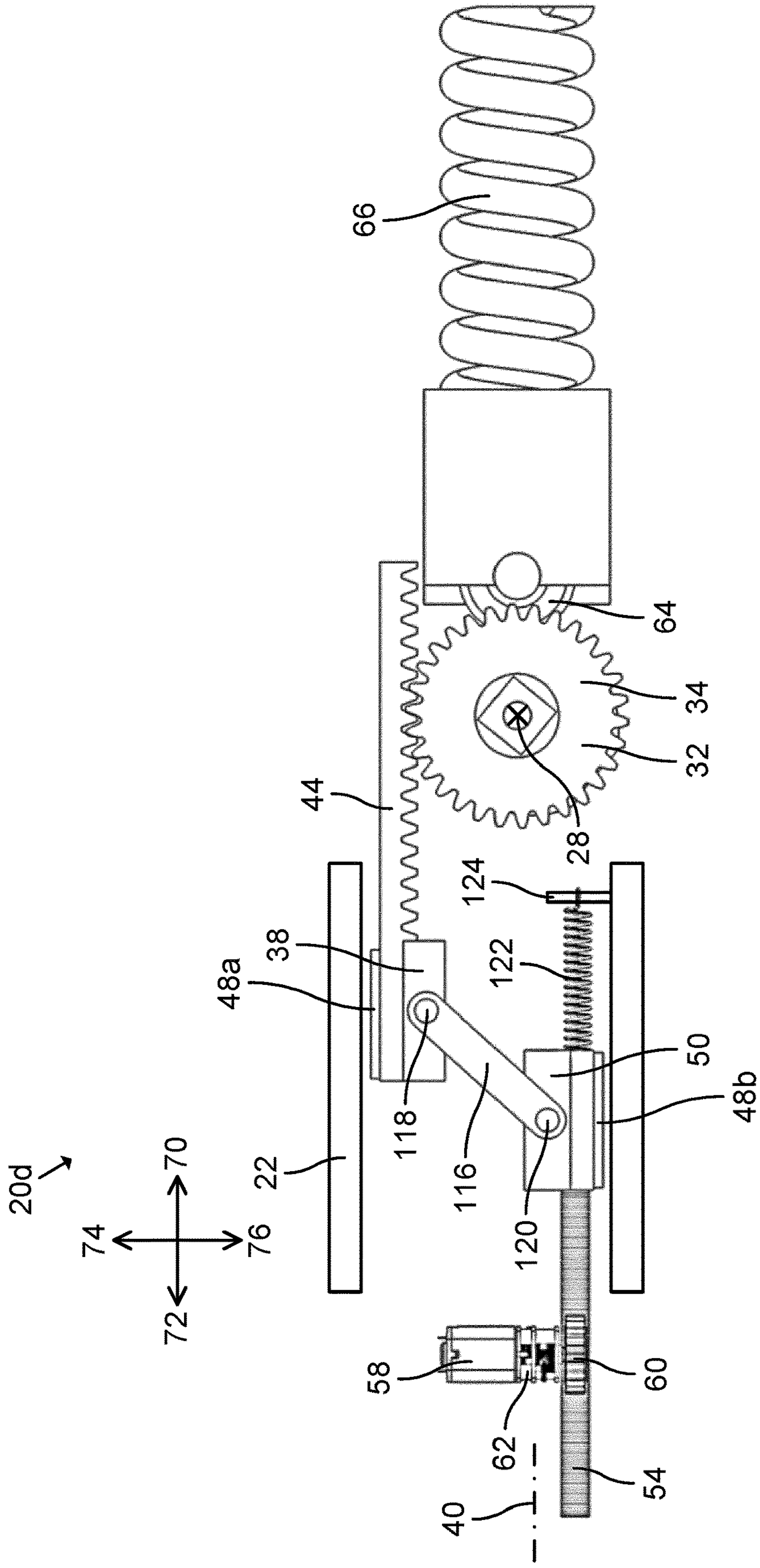
FIG. 7*b*: schematically represents a top view of the control arrangement in FIG. 7*a*.

FIG. 7*a* schematically represents a perspective view of a further example of a control arrangement 20*d*, and FIG. 7*b* schematically represents a top view of the control arrangement 20*d* in FIG. 7*a*. The control arrangement 20*d* may be used as the control arrangement 20 in any of the door closers 18*a*, 18*b*. With collective reference to FIGS. 7*a* and 7*b*, mainly differences with respect to FIGS. 3*a* and 3*b* will be described.

The control arrangement 20*d* comprises a force transmitting arm 116. The force transmitting arm 116 is a further example of a force transmitting arrangement according to the present disclosure. The force transmitting arm 116 is connected to the input member 38 at an input pivot 118 and to the output member 50 at an output pivot 120. The force transmitting arm 116 is rigid.

The control arrangement 20*d* of this example further comprises an optional base structure spring 122. The base structure spring 122 is one example of a base structure force device according to the present disclosure. The base structure spring 122 is here a tension coil spring connected to the output member 50 and to a pin 124 fixed to the base structure 22. The base structure spring 122 is arranged to force the output member 50 in the opening direction 70. As one alternative to the base structure spring 122, the input member 38 and/or the output member 50 can be made larger such that a lateral play therebetween is reduced or eliminated.

As shown, the control arrangement 20*d* does not comprise any inclined surfaces or pulling surfaces. Instead, the input member 38 pulls the output member 50 in the opening direction 70 by the force transmitting arm 116. In this example, the base structure pin 122 simultaneously pulls the output member 50 in the opening direction 70 such that the angle of the force transmitting arm 116 to the actuation axis 40 is maintained. Conversely, the input member 38 pushes the output member 50 in the closing direction 72 by the force transmitting arm 116. When the input member 38 moves faster than the output member 50 in the closing direction 72, the force transmitting arm 116 will rotate about the output pivot 120 such that the first and second brake pads 48*a*, 48*b* are forced laterally outwards to effect the frictional braking.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A control arrangement for controlling movements of an access member relative to a frame, the control arrangement comprising:

- a base structure;
- a drive member rotatable relative to the base structure about a rotation axis;
- an input member arranged to be driven relative to the base structure along an actuation axis by rotation of the drive member about the rotation axis, and arranged to move in a lateral direction with respect to the actuation axis relative to the base structure;
- an output member arranged to be driven by the input member relative to the base structure along the actuation axis;
- an electromagnetic generator arranged to be driven by movement of the output member along the actuation axis to generate electric energy; and
- a force transmitting arrangement arranged to transmit a relative movement between the input member and the output member along the actuation axis to a movement of the input member in the lateral direction towards the base structure for frictional braking between the input member and the base structure.

2. The control arrangement according to claim 1, wherein the force transmitting arrangement comprises an inclined surface, inclined relative to the actuation axis.

3. The control arrangement according to claim 2, wherein the inclined surface is inclined between 10 degrees to 40 degrees, inclusive, with respect to the actuation axis.

4. The control arrangement according to claim 2, further comprising one or more rollers arranged to engage the inclined surface.

5. The control arrangement according to claim 1, wherein the input member is movable along the actuation axis in an opening direction and in a closing direction, opposite to the opening direction.

6. The control arrangement according to claim 5, wherein the input member is arranged to push the output member in the closing direction.

7. The control arrangement according to claim 5, wherein the input member is arranged to pull the output member in the opening direction.

8. The control arrangement according to claim 7, wherein the input member comprises an input pulling surface and the output member comprises an output pulling surface, and wherein the input member is arranged to pull the output member in the opening direction by contact between the input pulling surface and the output pulling surface.

9. The control arrangement according to claim 8, wherein the input pulling surface and the output pulling surface are substantially perpendicular to the actuation axis.

10. The control arrangement according to claim 1, further comprising a connection device for connection between the access member and the frame, wherein a part of the connection device is fixed to the drive member for common rotation about the rotation axis.

11. The control arrangement according to claim 1, further comprising a closing force device arranged to force rotation of the drive member about the rotation axis to thereby force movement of the input member along the actuation axis.

12. The control arrangement according to claim 1, further comprising a generator wheel arranged to be rotationally driven by movement of the output member along the actuation axis, and a speed increasing generator transmission arranged to transmit a rotation of the generator wheel to a rotation of a rotor of the generator.

13. The control arrangement according to claim 1, wherein the input member and the output member are made of different types of materials.

14. The control arrangement according to claim 1, further comprising a release force device arranged to force the input member and the output member away from each other along the actuation axis.

15. An access member system comprising the frame, the access member movable relative to the frame, and the control arrangement according to claim 1.

* * * * *